United States Patent
Zhang et al.

(10) Patent No.: US 12,452,182 B2
(45) Date of Patent: Oct. 21, 2025

(54) METHOD AND DEVICE FOR PERFORMING DYNAMIC TRAFFIC SHAPING

(71) Applicant: MediaTek Singapore Pte. Ltd., Singapore (SG)

(72) Inventors: Xiayu Zhang, Chengdu (CN); Wei He, Chengdu (CN); Zhaoping Shu, Chengdu (CN); Guang Yang, Chengdu (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 122 days.

(21) Appl. No.: 18/325,209

(22) Filed: May 30, 2023

(65) Prior Publication Data
US 2024/0333650 A1  Oct. 3, 2024

(30) Foreign Application Priority Data

Apr. 3, 2023  (CN) .......................... 202310348532.3

(51) Int. Cl.
*H04L 47/22* (2022.01)
*H04L 47/28* (2022.01)

(52) U.S. Cl.
CPC .............. *H04L 47/22* (2013.01); *H04L 47/28* (2013.01)

(58) Field of Classification Search
None
See application file for complete search history.

(56) References Cited

U.S. PATENT DOCUMENTS

| | | | |
|---|---|---|---|
| 9,146,892 | B2 | 9/2015 | Lindsay |
| 10,261,935 | B1 | 4/2019 | Habusha |
| 11,818,050 | B2 | 11/2023 | Detwiller |
| 2019/0238472 | A1* | 8/2019 | Anand ............. H04L 41/12 |
| 2022/0086100 | A1 | 3/2022 | Biederman |
| 2025/0004976 | A1* | 1/2025 | Li ................. G06F 13/4221 |

FOREIGN PATENT DOCUMENTS

| | | |
|---|---|---|
| CN | 101420308 A | 4/2009 |
| TW | 202301842 A | 1/2023 |

OTHER PUBLICATIONS

Ravi Budruk, An Introduction to PCI, 2012, MindShare (Year: 2012).*
Chinese language office action dated Jan. 10, 2024, issued in application No. TW 112120090.

* cited by examiner

*Primary Examiner* — Fadi Haj Said
(74) *Attorney, Agent, or Firm* — McClure, Qualey & Rodack, LLP (57) ABSTRACT

A method for performing dynamic traffic shaping is provided. The method includes adjusting an expiration time of a timer and a packet count threshold by a processor of a transmitting device according to throughput of transmission from an application of the transmitting device to a receiving device. The method includes holding application packets from the application by the processor until the expiration time expires or a packet count exceeds the packet count threshold, whichever occurs first. The method includes transmitting the application packets by the processor to the receiving device over an interconnectivity bus.

17 Claims, 8 Drawing Sheets

METHOD AND DEVICE FOR PERFORMING DYNAMIC TRAFFIC SHAPING

CROSS REFERENCE TO RELATED APPLICATIONS

This application claims priority from China Patent Application No. 202310348532.3, filed on Apr. 3, 2023, the disclosure of which are incorporated herein in their entirety by reference.

BACKGROUND OF THE INVENTION

Field of the Invention

The present disclosure generally relates to power saving techniques. More specifically, aspects of the present disclosure relate to a method and a device for performing dynamic traffic shaping.

Description of the Related Art

Many modern computer systems use a peripheral component interconnect express (PCIe) interface to communicate between two PCIe devices. An important power saving feature of PCIe is Active State Power Management (ASPM). When a power-saving mode (e.g., L1 sub-states L1.0, L1.1 and L1.2) of ASPM is enabled on a given PCIe link, and the link has been in idle for a period of time (e.g., tens or hundreds of microseconds), the PCIe link will transition to the power-saving mode that consumes much less power than the full power, fully functional link state L0 (highest power state).

However, a distributed data transmission between two PCIe devices will cause the power saving mode to be interrupted frequently due to lots of link accesses.

Therefore, a method and a device for performing dynamic traffic shaping are needed to enable the PCIe link to enter the power-saving mode without interruption for a long time.

BRIEF SUMMARY OF THE INVENTION

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide method and a device for performing dynamic traffic shaping to enable the PCIe link to enter the power-saving mode without interruption for a long time and save more power.

In an exemplary embodiment, a method for performing dynamic traffic shaping is provided. The method comprises adjusting an expiration time of a timer and a packet count threshold by a processor of a transmitting device according to throughput of transmission from an application of the transmitting device to a receiving device. The method comprises holding application packets from the application by the processor until the expiration time expires or a packet count exceeds the packet count threshold, whichever occurs first. The method comprises transmitting the application packets by the processor to the receiving device over an interconnectivity bus.

In some embodiments, a first expiration time on the timer when the throughput is in a high throughput range is shorter than a second expiration time on the timer when the throughput is in a low throughput range.

In some embodiments, the expiration time on the timer and the packet count threshold are dynamically adjusted according to the throughput of the transmission.

In some embodiments, the application packets are transmitted in a batch to the receiving device.

In some embodiments, the interconnectivity bus is a peripheral component interconnect express (PCIe) bus.

In some embodiments, the transmitting device comprises a root complex and the receiving device comprises an endpoint.

In some embodiments, the transmitting device comprises an endpoint and the receiving device comprises a root complex.

In an exemplary embodiment, a device for performing dynamic traffic shaping is provided. The device comprises one or more processors; and one or more computer storage media for storing one or more computer-readable instructions. The processor is configured to read the instructions from the computer storage media and execute the following tasks. The processor adjusts an expiration time of a timer and a packet count threshold according to throughput of transmission from an application of the device to a receiving device. The processor holds application packets from the application until the expiration time expires or a packet count exceeds the packet count threshold, whichever occurs first. The processor transmits the application packets to the receiving device over an interconnectivity bus.

In an exemplary embodiment, a non-transitory computer-readable storage medium storing instructions that, when executed by a processor in a device, cause the device to perform a method for dynamic traffic shaping is provided. The method comprises adjusting an expiration time of a timer and a packet count threshold according to throughput of transmission from an application of the device to a receiving device. The method comprises holding application packets from the application until the expiration time expires or a packet count exceeds the packet count threshold, whichever occurs first. The method comprises transmitting the application packets to the receiving device over an interconnectivity bus.

BRIEF DESCRIPTION OF THE DRAWINGS

The accompanying drawings are included to provide a further understanding of the present disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION OF THE INVENTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

The described embodiments perform operations for performing dynamic traffic shaping over an interconnectivity bus between a transmitting device and a receiving device. In the described embodiments, the interconnectivity bus mainly is a peripheral component interconnect express (PCIe) bus, and a link between the transmitting device and the receiving device may be a PCIe link conforming to the PCI special interest group (PIC-SIG) PCIe specification (e.g., PCI Express 3.0 Base specification revision 3.0).

The transmitting device may communicate over the PCIe link with the receiving device. The receiving device may exchange data and/or other information with the transmitting device over the PCIe link. However, when the PCIe link remains idle for a period of time, the transmitting device and the receiving device may implement one of the available power-saving modes in order to reduce the power consumed by the PCIe link while it is not being used. The transmitting device and the receiving device may reduce the power consumption of the PCIe link by transitioning from the L state L0 (highest power state) to a lower power L state (e.g., L1 sub-states L1.0, L1.1 and L1.2) as defined by the PCIe specification. How to prevent the PCIe link from being frequently transitioned between the L state L0 and the lower power L state will be described below.

Figure 1A:
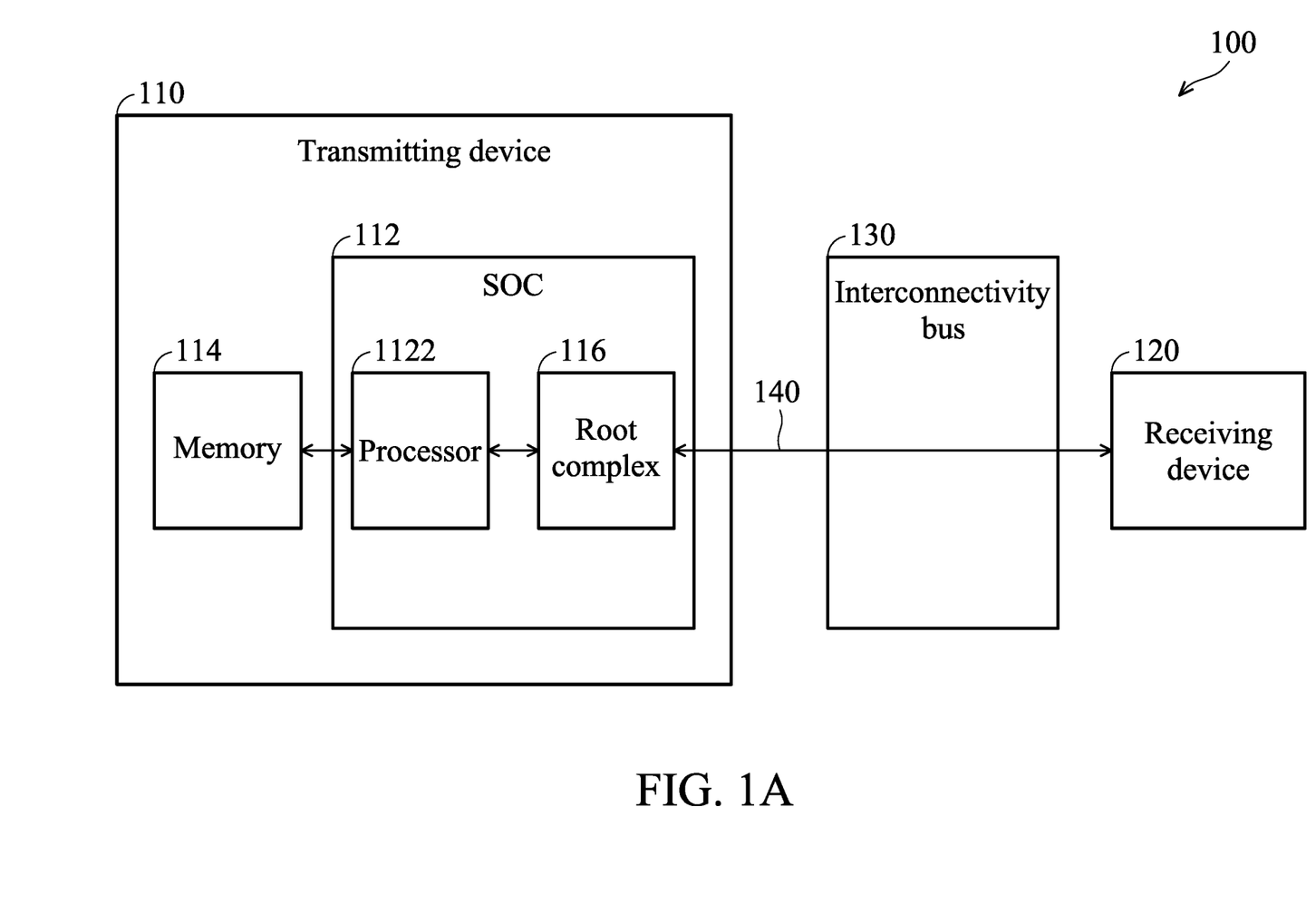
FIGS. 1A~1C are block diagrams illustrating an example link environment operable to perform dynamic traffic shaping according to an embodiment of the disclosure.
Figure 1B:
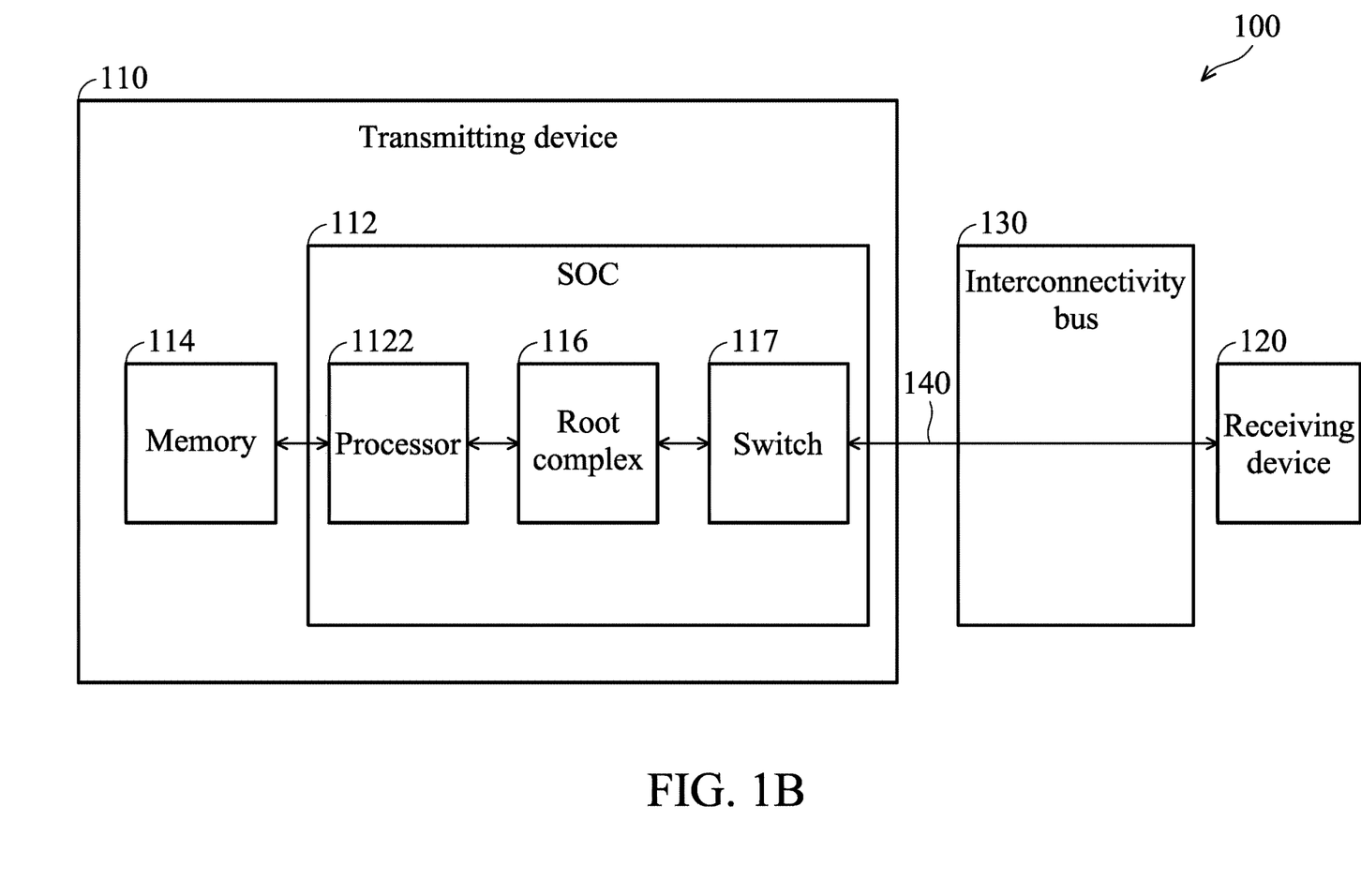
Figure 1C:
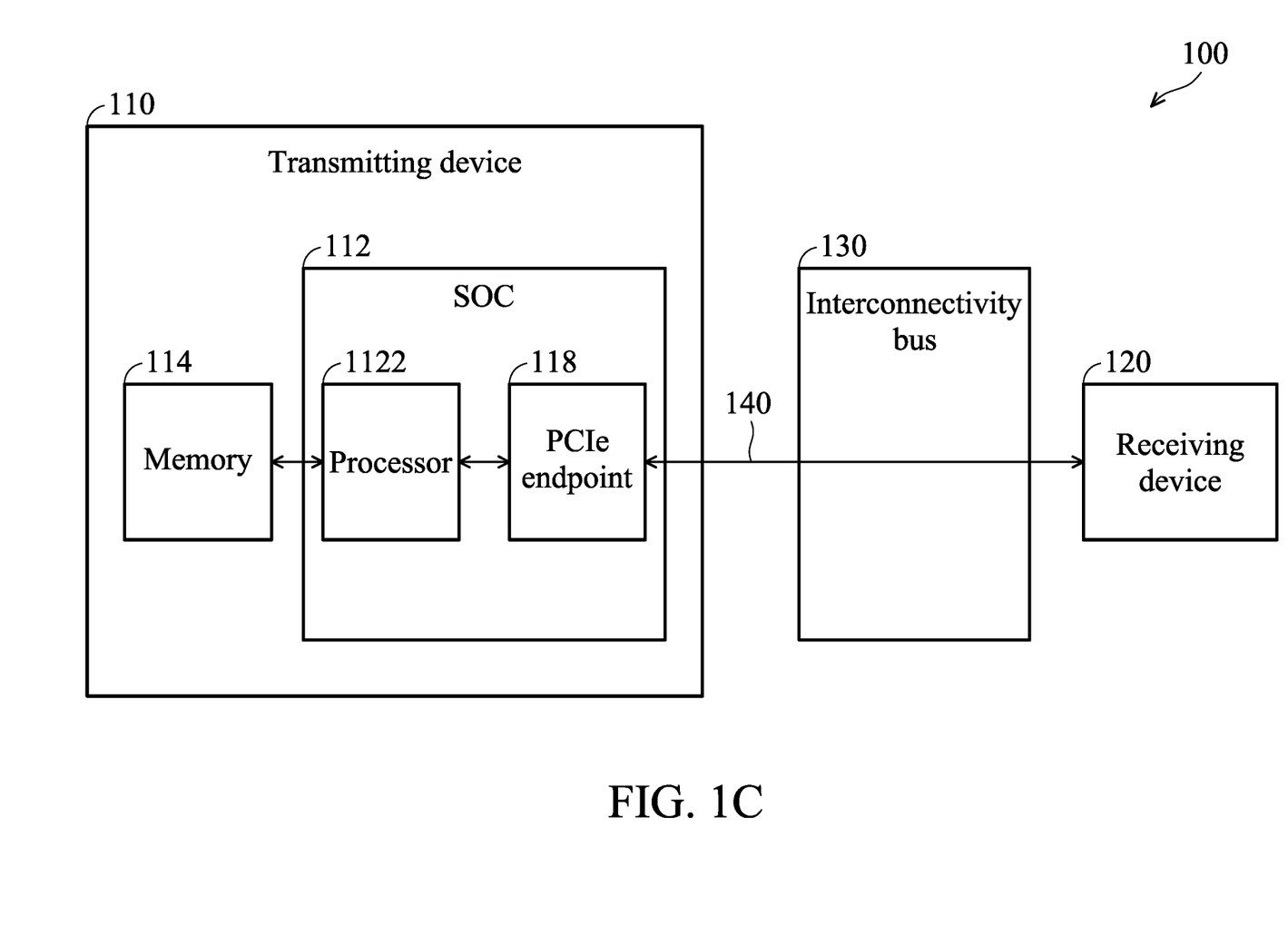

FIGS. 1A~1C are block diagrams illustrating an example link environment 100 operable to perform dynamic traffic shaping according to an embodiment of the disclosure. The link environment 100 at least comprises a transmitting device 110 and a receiving device 120, wherein the transmitting device 110 and the receiving device 120 are connected by an interconnectivity bus 130.

The transmitting device 110 may be (or may be included in) any device that communicates with the receiving device 120 over the interconnectivity bus 130. For example, the transmitting device 110 may be (or may be included in) a laptop computer, desktop computer, a server, an appliance, a subnotebook/netbook, a tablet computer, a cellular phone, a personal digital assistant (PDA), a smartphone, or another device. Note that the transmitting device 110 may include other subsystems (not shown) including but not limited to communications subsystems, display subsystems, data collection subsystems, audio and/or video subsystems, alarm subsystems, media processing subsystems, input/output (I/O) subsystems, and/or one or more other processing subsystems (e.g., CPUs), or power subsystems (e.g., battery, battery management unit, and/or other power management subsystems).

The receiving device 120 is any device that may communicate with the transmitting device 110 over the interconnectivity bus 130. The receiving device 120 may be or may include one or more devices or systems (e.g., peripherals) that perform functionalities including, for example, wireless communications, storage, and/or graphics processing. Note that in some embodiments, the receiving device 120 may be located inside the transmitting device 110, while in some embodiments the receiving device 120 may be located externally to the transmitting device 110. The receiving device 120 will be discussed in more detail below with respect to FIG. 2.

A link 140 between the transmitting device 110 and the receiving device 120 is a PCIe link that allows communication between the transmitting device 110 and the receiving device 120 using a PCIe specification such as PCIe base specification 3.0 by PCI-SIG.

The transmitting device 110 may at least comprise a system on a chip (SOC) 112 and a memory 114. The SOC 112 at least comprises a processor 1122 and may comprise other subsystems (not shown) such as memory, counters, clocks, interface regulators, power management circuits, and/or analog and/or digital interfaces. Additionally, note that in some embodiments, more than one PCIe link 140 may be connected to the processor 1122.

The processor 1122 comprises one or more devices configured to perform computational operations. For example, the processor 1122 may comprise one or more microprocessors each with one or more cores, application-specific integrated circuits (ASICs), microcontrollers, and/or programmable-logic devices. In some embodiments, some or all of the functionality of the SOC 112 may be replaced by one or more circuits that may include one or more microprocessors and/or multicore processing systems.

The memory 114 comprises one or more devices for storing data and/or instructions for subsystems in the transmitting device 110 including those on the SOC 112 such as the processor 1122. The memory 114 may comprise dynamic random access memory (DRAM), static random access memory (SRAM), and/or other types of memory, and may comprise mechanisms for controlling access to the memory. In some embodiments, the memory 114 comprises a memory hierarchy that comprises one or more caches coupled to a memory (not shown) in the SOC 112. In some embodiments, the memory 114 is coupled to one or more high-capacity mass-storage devices (not shown). For example, the memory 114 may be coupled to a magnetic or optical drive, a solid-state drive, or another type of mass-storage device. In these embodiments, the memory 114 may be used by the transmitting device 110 as fast-access storage for often-used data, while the mass-storage device is used to store less frequently used data.

Furthermore, in this context, one of the transmitting device 110 and the receiving device 120 may comprise a root complex 116 (and a switch 117), and the other may comprise an endpoint 118 as those terms are used in the PCIe standard. In some embodiment, the interconnectivity bus 130 is a PCIe bus, and the form factors of the interconnectivity bus 130 may be a PCIe standard connector or a M.2 connector.

It should be noted that although the transmitting device and the receiving device are mainly a root complex and an endpoint as an example in the present disclosure, it should not be limited in the disclosure. The transmitting device and the receiving device may be other PCIe devices.

Figure 2:
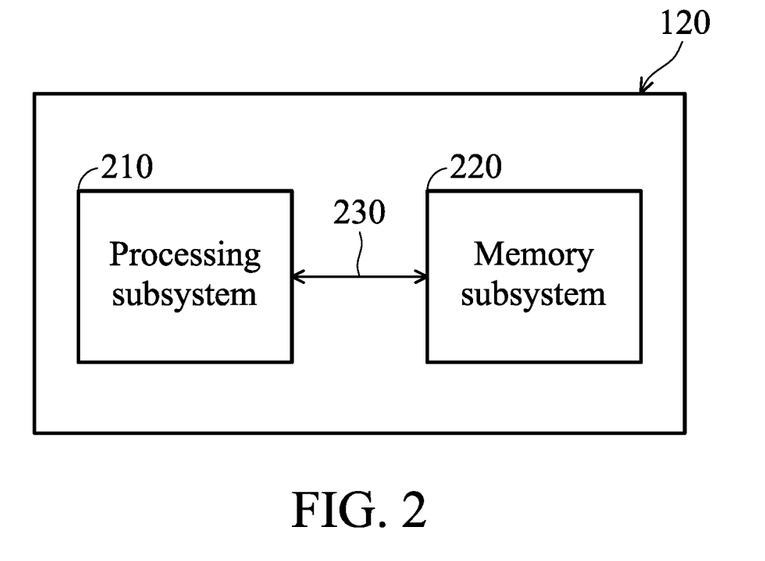
FIG. 2 presents a block diagram illustrating the receiving device in according to an embodiment of the present disclosure.

FIG. 2 presents a block diagram illustrating the receiving device 120 in according to an embodiment of the present disclosure. The receiving device 120 comprises a processing subsystem 210 and a memory subsystem 220 coupled to a bus 230. The receiving device 120 may comprise other subsystems (not shown) such as subsystems for wireless communications, mass storage, and/or graphics processing, in addition to subsystems (not shown) for coupling to and communicating over an interconnectivity bus 130.

The processing subsystem 210 is any processing subsystem configured to perform computational and/or logic operations that may be used in a receiving device, and may be implemented in any technology, including but not limited to any type of hardware module, software, firmware, and/or any other general purpose or special purpose logic. The processing subsystem 210 may comprise but is not limited to one or more central processing units (CPUs), microprocessors, application-specific integrated circuit (ASIC) chips, field-programmable gate arrays (FPGAs), other programmable-logic devices, dedicated logic devices, and microcontrollers.

The memory subsystem 220 comprises one or more devices for storing data and/or instructions for the processing subsystem 210 and other subsystems (not shown) in the receiving device 120. For example, the memory subsystem 220 may comprise a dynamic random access memory (DRAM), a static random access memory (SRAM), a read-only memory (ROM), an erasable programmable read-only memory (EPROM), a flash memory, and/or other types of memory. In addition, the memory subsystem 220 may comprise firmware and mechanisms for controlling access to a memory or other subsystems (not shown) in the receiving device 120.

The processing subsystem 210 and the memory subsystem 220 are coupled together using the bus 230. The bus 230 is an electrical, optical, or electro-optical connection that these subsystems and, in some embodiments, other subsystems (not shown) in the receiving device 120 may use to communicate commands and data among one another. Although only one bus 230 is shown for clarity, different embodiments may comprise a different number or configuration of electrical or other connections among the subsystems.

Although the processing subsystem 210 and the memory subsystem 220 are shown as separate subsystems in FIG. 2, in some embodiments, one or both of these subsystems can be integrated into one or more other subsystems in the receiving device 120. Furthermore, in some embodiments, the receiving device 120 may comprise one or more additional processing subsystems 210 and/or memory subsystems 220, and although we use specific subsystems to describe the receiving device 120, in alternative embodiments, different subsystems may be present in the receiving device 120. Additionally, although the processing subsystem 210 and the memory subsystem 220 are depicted as separate subsystems in FIG. 2, in some embodiments these and other subsystems (not shown) in the receiving device 120 may be implemented on one integrated circuit.

Figure 3:
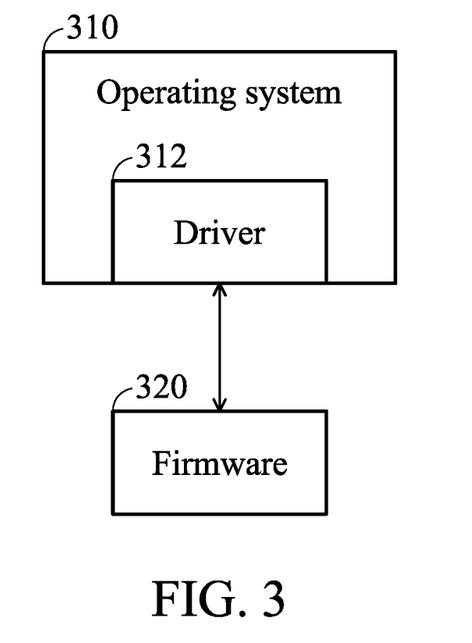
FIG. 3 presents a block diagram illustrating an operating system with a driver operating on the transmitting device coupled over a PCIe link to the firmware operating on the receiving device in accordance with the described embodiments.

FIG. 3 presents a block diagram illustrating an operating system 310 with a driver 312 operating on the transmitting device 110 coupled over a PCIe link to the firmware 320 operating on the receiving device 120 in accordance with the described embodiments.

In some embodiments, the operating system 310 is stored (as program codes) in the memory 114 and executed by the processor 1122. Generally, the operating system 310 serves as an intermediary between a system hardware in the transmitting device 110 and applications executed by the processor 1122, which can be, for example, an email application, a web browser, and a game application. The operating system 310 also comprises a driver 312 which enables the operating system 310 and other applications operating on the processor 1122 to communicate with the receiving device 120. The operating system 310 and its general functions are known in the art and hence are not described in detail.

The receiving device 120 comprises a firmware 320 which may be preloaded on the receiving device 120 and/or dynamically loaded by the driver 312, and generally includes data and/or programming used to operate and control the receiving device 120. The firmware 320 may be stored in the memory subsystem 220 in a read-only memory (ROM), a programmable read-only memory (PROM), and/or an erasable programmable read-only memory (EPROM), and executed on the processing subsystem 210. In some embodiments, the firmware 320 may be partially or completely replaced by software stored in the memory subsystem 220 and operating on the processing subsystem 202, and/or one or more hardware modules (not shown) in the receiving device 120.

In the above embodiments, the transmitting device 110 and the receiving device 120 are explained, but the disclosure is not limited to these examples, but may be effectively applied in embedded devices.

Figure 6:
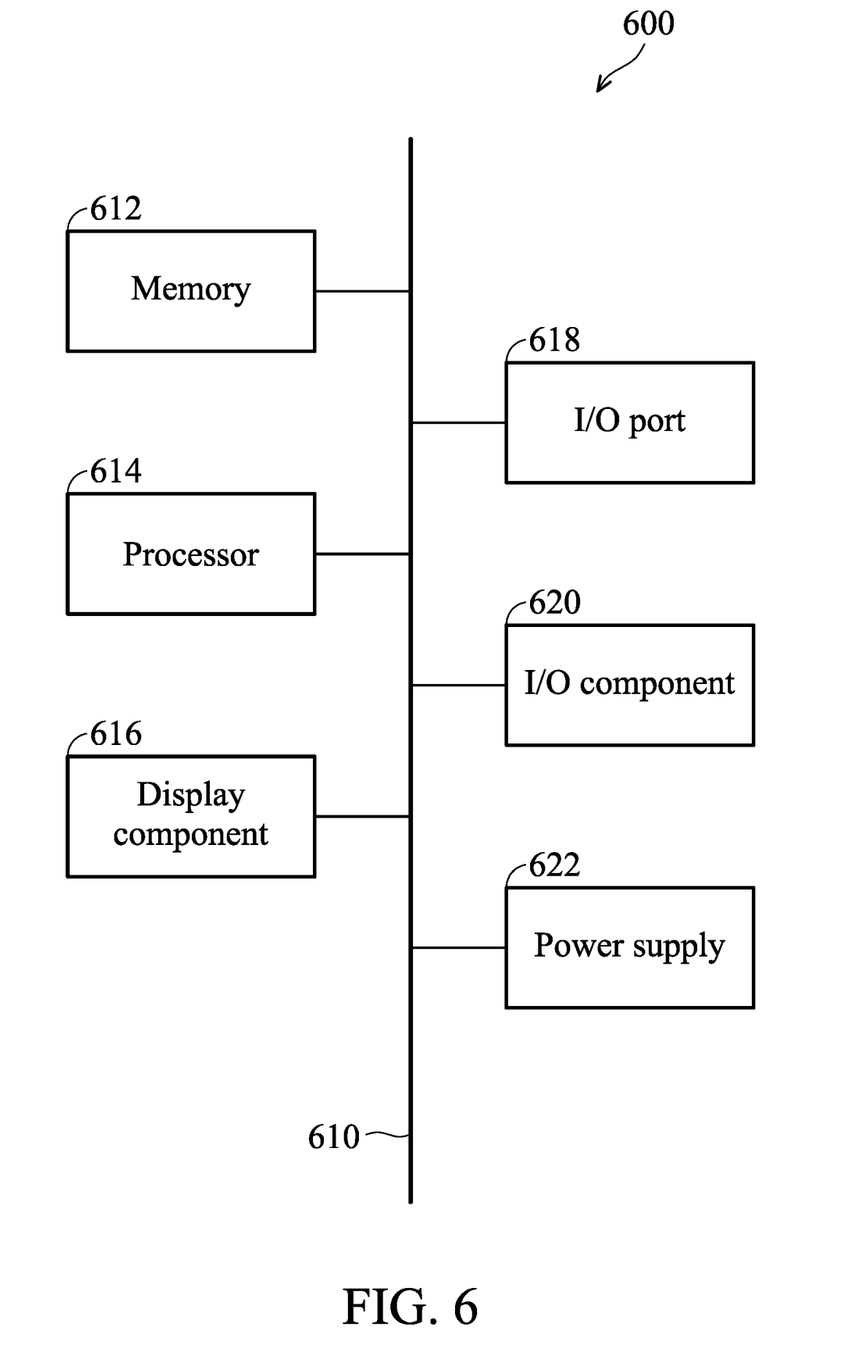
FIG. 6 illustrates an exemplary operating environment for implementing embodiments of the present disclosure.

It should be understood that the transmitting device 110 and the receiving device 120 shown in FIG. 1 is an example of one suitable link environment 100. The transmitting device 110 and the receiving device 120 shown in FIG. 1 can be implemented via any type of computing device, such as the computing device 600 described with reference to FIG. 6, as shown in FIG. 6.

Figure 4:
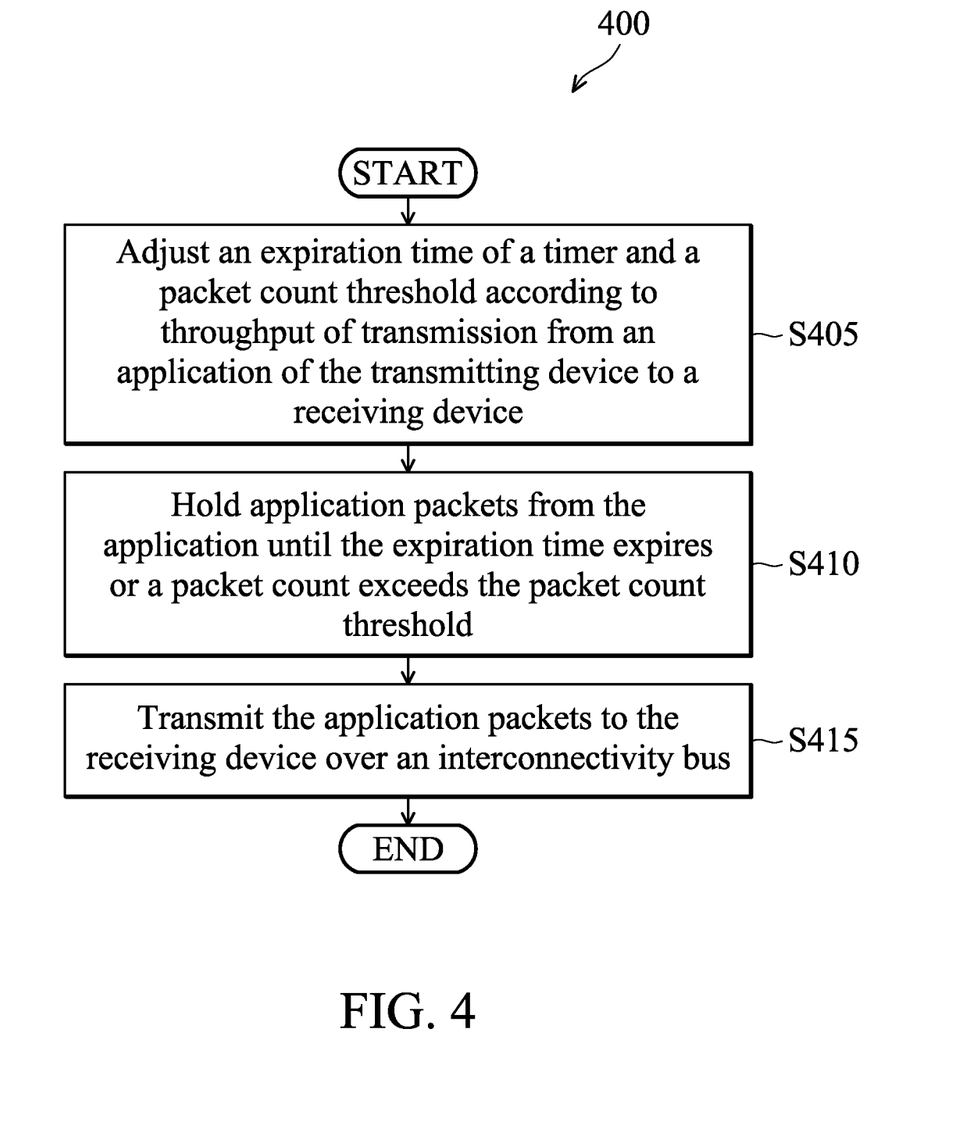
FIG. 4 is a flow chart illustrating a method for performing dynamic traffic shaping according to an embodiment of the disclosure.

FIG. 4 is a flow chart 400 illustrating a method for performing dynamic traffic shaping according to an embodiment of the disclosure. In this embodiment, the method is applied to the processor 1122 of the transmitting device 110 in FIG. 1.

In step S405, the processor of the transmitting device adjusts an expiration time of a timer and a packet count threshold according to throughput of transmission from an application of the transmitting device to a receiving device, wherein the expiration time on the timer and the packet count threshold are dynamically adjusted according to the throughput of the transmission.

Specifically, the processor may obtain the throughput of the current transmission, and dynamically adjust the expiration time and the packet count threshold according to the throughput of the current transmission. For example, in case of low throughput, the processor increases the expiration time and the packet count threshold. In the case of high throughput, the processor reduces the expiration time and the packet count threshold. In another embodiment, cases marked by low throughput may be visiting news websites, playing music, or sending emails. Cases marked by high throughput may be performing network speed tests, performing a high-speed download, or playing 4 K and 8 K videos and live broadcast.

Then, in step S410, the processor of the transmitting device holds application packets from the application until the expiration time expires or a packet count exceeds the packet count threshold, whichever occurs first. In one embodiment, a first expiration time on the timer when the throughput is in a high throughput range is shorter than a second expiration time on the timer when the throughput is in a low throughput range.

In step S415, the processor of the transmitting device transmits the application packets to the receiving device over an interconnectivity bus, wherein the interconnectivity bus comprises a peripheral component interconnect express (PCIe) bus. In one embodiment, the application packets are transmitted in a batch to the receiving device.

In some embodiments, the transmitting device comprises a root complex (and a switch), and the receiving device comprises an endpoint, and vice versa.

Figure 5A:
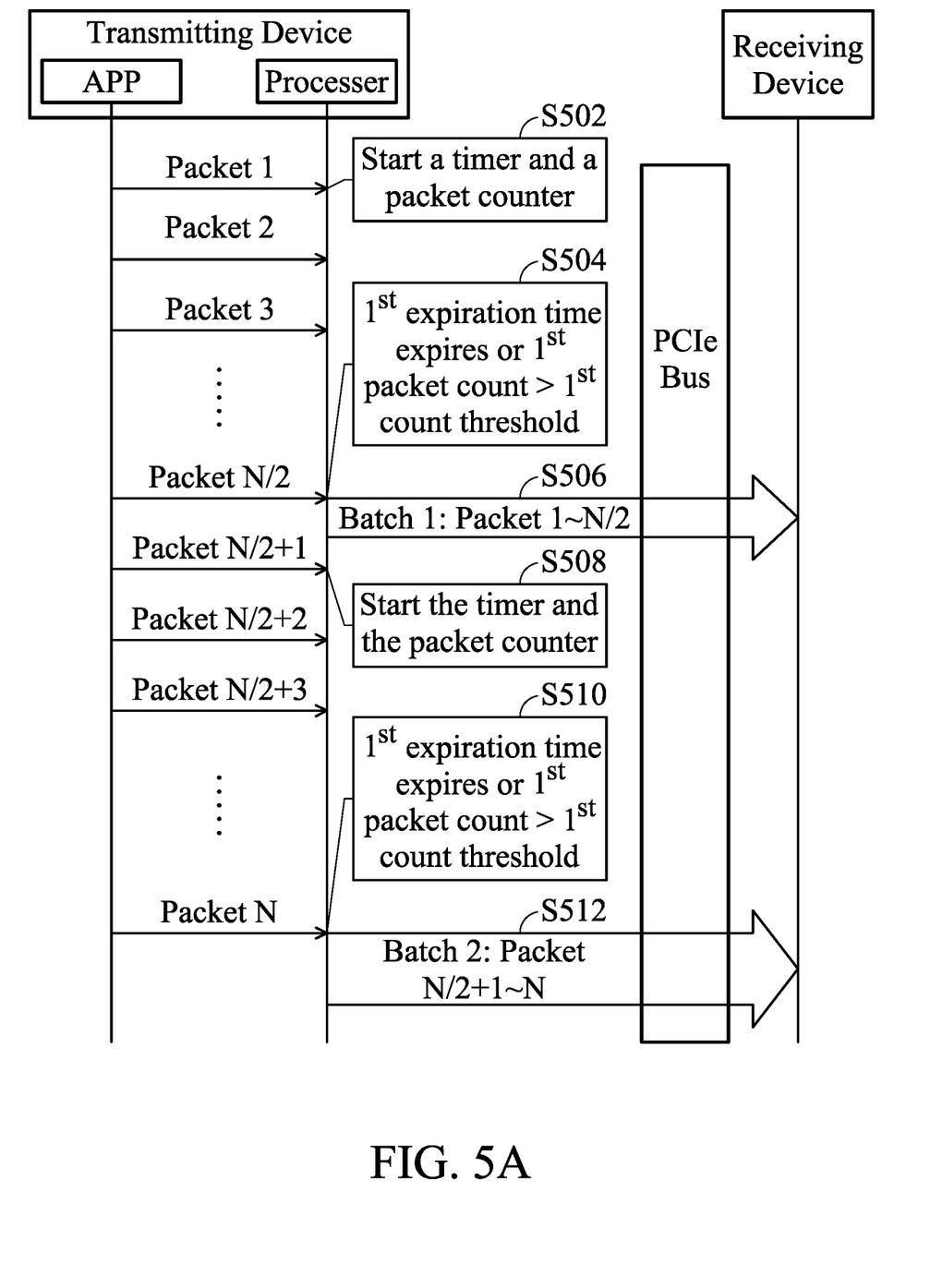
FIGS. 5A~5B are message sequence charts illustrating an exemplary dynamic traffic shaping procedure between a transmitting device and a receiving device according to an embodiment of the disclosure.
Figure 5B:
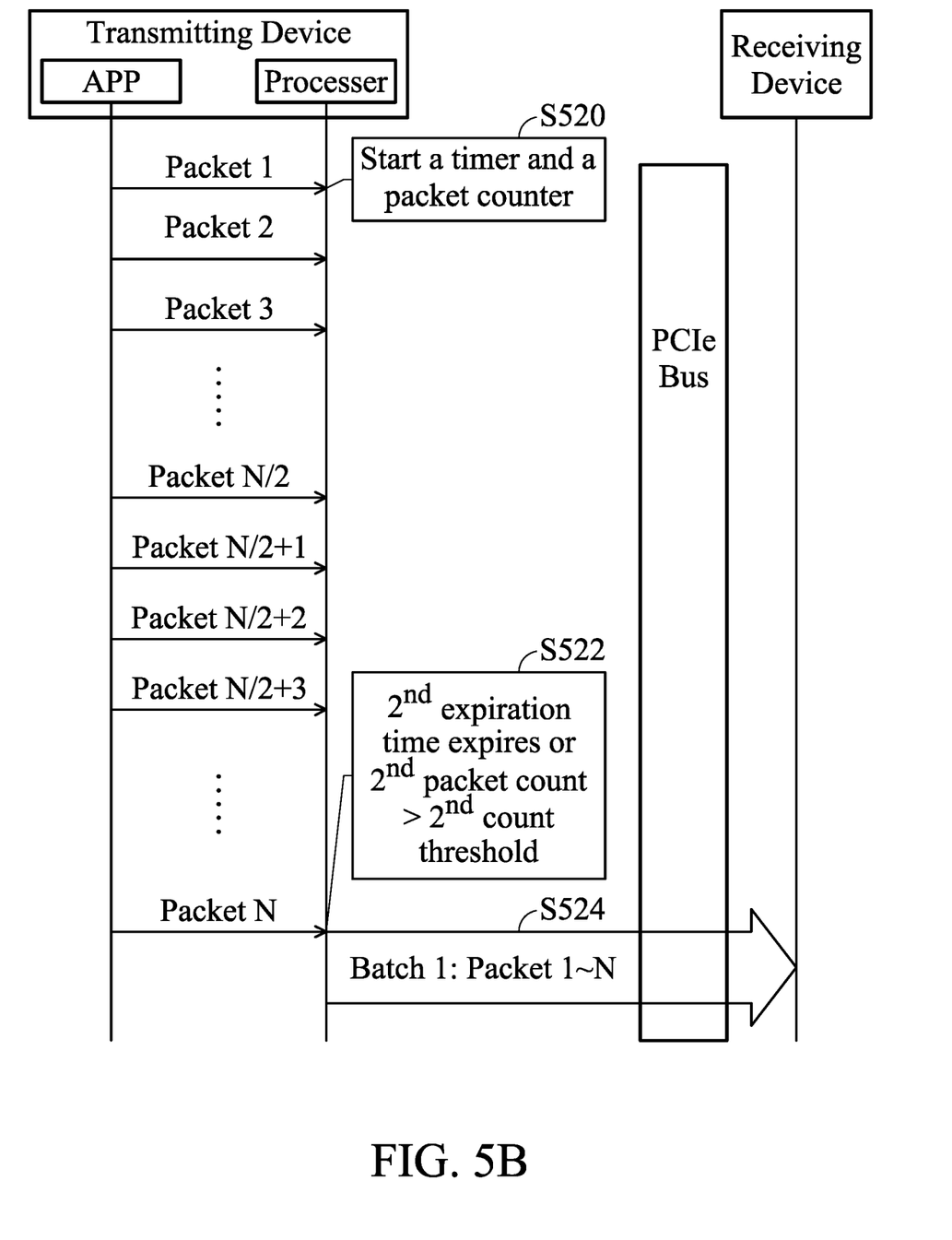

FIGS. 5A~5B are message sequence charts illustrating an exemplary dynamic traffic shaping procedure between a transmitting device and a receiving device according to an embodiment of the disclosure.

In this embodiment, the interconnectivity bus between the transmitting device and the receiving device is a PCIe bus, but the present disclosure should not be limited thereto.

Furthermore, the processor of the transmitting device may calculate the first expiration time and the first packet count threshold for high throughput, and the second expiration time and the second packet count threshold for low throughput according to the throughput of the transmission before the procedure starts. In this embodiment, the first expiration time is shorter than the second expiration time, and the first packet count threshold is shorter than the second packet count threshold.

FIG. 5A depicts cases where the transmission is a high-throughput transmission. In FIG. 5A, the processor in the transmitting device may start a timer and a packet counter (S502) upon receiving an application packet (Packet 1) transmitted by the application (APP), wherein the timer counts the first expiration time, and the packet counter counts the first packet count.

Then, the application packets (Packet 1, Packet 2, . . . , Packet N/2) are held in the processor until the first expiration time expires or the first packet count exceeds the first count threshold, whichever occurs first (S504).

The processor transmits the application packets (Packet 1, Packet 2, . . . , Packet N/2) in a batch (Batch 1: Packet 1~Packet N/2) to the receiving device over the PCIe bus (S506).

The processor in the transmitting device may restart the timer and the packet counter (S508) when receiving an application packet (Packet N/2+1) transmitted by the APP.

Then, the application packets (Packet N/2+1, Packet N/2+2, . . . , Packet N) are held in the processor until the first expiration time expires or the first packet count exceeds the first count threshold, whichever occurs first (S510).

The processor transmits the application packets (Packet N/2+1, Packet N/2+2, . . . , Packet N) in a batch (Batch 2: Packet N/2+1~Packet N) to the receiving device over the PCIe bus (S512).

FIG. 5B depicts cases where the transmission is a low throughput transmission. In FIG. 5B, the processor in the transmitting device may start a timer and a packet counter (S520) when receiving an application packet (Packet 1) transmitted by the APP, wherein the timer counts the second expiration time, and the packet counter counts the second packet count.

Then, the application packets (Packet 1, Packet 2, . . . , Packet N/2, Packet N/2+1, . . . , Packet N) are held in the processor until the second expiration time expires or the second packet count exceeds the second count threshold, whichever occurs first (S522).

The processor transmits the application packets (Packet 1, Packet 2, . . . , Packet N/2, Packet N/2+1, . . . , Packet N) in a batch (Batch 1: Packet 1~Packet N) to the receiving device over the PCIe bus (S524).

As shown in FIG. 5A and FIG. 5B, compared to the case of low throughput transmission, even though the total number of application packets in FIG. 5A and FIG. 5B is the same, the processor in the transmitting device may transmit more batches of application packets to the receiving device in the case of high-throughput transmission.

As mentioned above, the method and device for performing dynamic traffic shaping in the disclosure may dynamically adjust the expiration time on the timer and the packet count threshold according to different cases of throughput of the transmission. By holding the packets at the transmitting device in this fashion, unnecessary transitions between low power states and high power states on the PCIe bus are reduced and power is conserved.

Having described embodiments of the present disclosure, an exemplary operating environment in which embodiments of the present disclosure may be implemented is described below. Referring to FIG. 6, an exemplary operating environment for implementing embodiments of the present disclosure is shown and generally known as a computing device 600. The computing device 600 is merely an example of a suitable computing environment and is not intended to limit the scope of use or functionality of the disclosure. Neither should the computing device 600 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 6, the computing device 600 may include a bus 610 that is directly or indirectly coupled to the following devices: one or more memories 612, one or more processors 614, one or more display components 616, one or more input/output (I/O) ports 618, one or more input/output components 620, and an illustrative power supply 622. The bus 610 may represent one or more kinds of busses (such as an address bus, data bus, or any combination thereof). Although the various blocks of FIG. 6 are shown with lines for the sake of clarity, and in reality, the boundaries of the various components are not specific. For example, the display component such as a display device may be considered an I/O component and the processor may include a memory.

The computing device 600 typically includes a variety of computer-readable media. The computer-readable media can be any available media that can be accessed by computing device 600 and includes both volatile and nonvolatile media, removable and non-removable media. By way of example, not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the computing device 600. The computer storage media may not comprise signals per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 612 may include computer-storage media in the form of volatile and/or nonvolatile memory. The memory may be removable, non-removable, or a combination thereof. Exemplary hardware devices include solid-state memory, hard drives, optical-disc drives, etc. The computing device 600 includes one or more processors that read data from various entities such as the memory 612 or the I/O components 620. The display component(s) 616 present data indications to a user or to another device. Exemplary presentation components include a display device, speaker, printing component, vibrating component, etc.

The I/O ports 618 allow the computing device 600 to be logically coupled to other devices including the I/O components 620, some of which may be embedded. Illustrative components include a microphone, joystick, game pad, satellite dish, scanner, printer, wireless device, etc. The I/O components 620 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the computing device 600, or any combination thereof. The computing device 600 may be equipped with depth cameras, such as stereoscopic camera systems, infrared camera systems, RGB camera systems, or any combination thereof, to realize gesture detection and recognition. Furthermore, the computing device 600 may be equipped with accelerometers or gyroscopes that enable detection of motion. The output of the accelerometers or gyroscopes may be provided to the display of the computing device 600 to carry out immersive augmented reality or virtual reality.

Furthermore, the processor 614 in the computing device 600 can execute the program code in the memory 612 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for performing dynamic traffic shaping, comprising:
    adjusting an expiration time of a timer and a packet count threshold by a processor of a transmitting device according to throughput of transmission from an application of the transmitting device to a receiving device;
    holding application packets from the application by the processor until the expiration time expires or a packet count exceeds the packet count threshold, whichever occurs first; and
    transmitting the application packets by the processor to the receiving device over a peripheral component interconnect express (PCIe) bus when the expiration time expires or the packet count exceeds the packet count threshold;

wherein one of the transmitting device and the receiving device comprises a root complex, and the other of the transmitting device and the receiving device comprises an endpoint.

2. The method for performing dynamic traffic shaping as claimed in claim 1, wherein a first expiration time on the timer when the throughput is in a high throughput range is shorter than a second expiration time on the timer when the throughput is in a low throughput range.

3. The method for performing dynamic traffic shaping as claimed in claim 1, wherein the expiration time on the timer and the packet count threshold are dynamically adjusted according to the throughput of the transmission.

4. The method for performing dynamic traffic shaping as claimed in claim 1, wherein the application packets are transmitted in a batch to the receiving device.

5. The method for performing dynamic traffic shaping as claimed in claim 1, wherein the transmitting device comprises the root complex and the receiving device comprises the endpoint.

6. The method for performing dynamic traffic shaping as claimed in claim 1, wherein the transmitting device comprises the endpoint and the receiving device comprises the root complex.

7. A device for performing dynamic traffic shaping, comprising:

one or more processors; and one or more computer storage media for storing one or more computer-readable instructions, wherein the processor is configured to read the instructions from the computer storage media and execute the following tasks:

adjusting an expiration time of a timer and a packet count threshold according to throughput of transmission from an application of the device to a receiving device;

holding application packets from the application until the expiration time expires or a packet count exceeds the packet count threshold, whichever occurs first; and transmitting the application packets to the receiving device over a peripheral component interconnect express (PCIe) bus when the expiration time expires or the packet count exceeds the packet count threshold;

wherein one of the transmitting device and the receiving device comprises a root complex, and the other of the transmitting device and the receiving device comprises an endpoint.

8. The device for performing dynamic traffic shaping as claimed in claim 7, wherein a first expiration time on the timer when the throughput is in a high throughput range is shorter than a second expiration time on the timer when the throughput is in a low throughput range.

9. The device for performing dynamic traffic shaping as claimed in claim 7, wherein the expiration time on the timer and the packet count threshold are dynamically adjusted according to the throughput of the transmission.

10. The device for performing dynamic traffic shaping as claimed in claim 7, wherein the application packets are transmitted in a batch to the receiving device.

11. The device for performing dynamic traffic shaping as claimed in claim 7, wherein the device comprises the root complex and the receiving device comprises an endpoint.

12. The method for performing dynamic traffic shaping as claimed in claim 7, wherein the device comprises the endpoint and the receiving device comprises the root complex.

13. A non-transitory computer-readable storage medium storing instructions that, when executed by a processor in a device, cause the device to perform a method for dynamic traffic shaping, the method comprising:

adjusting an expiration time of a timer and a packet count threshold according to throughput of transmission from an application of the device to a receiving device;

holding application packets from the application until the expiration time expires or a packet count exceeds the packet count threshold, whichever occurs first; and transmitting the application packets to the receiving device over a peripheral component interconnect express (PCIe) bus when the expiration time expires or the packet count exceeds the packet count threshold;

wherein one of the transmitting device and the receiving device comprises a root complex, and the other of the transmitting device and the receiving device comprises an endpoint.

14. The non-transitory computer-readable storage medium as claimed in claim 13, wherein a first expiration time on the timer when the throughput is in a high throughput range is shorter than a second expiration time on the timer when the throughput is in a low throughput range.

15. The non-transitory computer-readable storage medium as claimed in claim 13, wherein the expiration time on the timer and the packet count threshold are dynamically adjusted according to the throughput of the transmission.

16. The non-transitory computer-readable storage medium as claimed in claim 13, wherein the application packets are transmitted in a batch to the receiving device.

17. The non-transitory computer-readable storage medium as claimed in claim 13, wherein the device comprises the root complex and the receiving device comprises the endpoint, or wherein the device comprises the endpoint and the receiving device comprises the root complex.

* * * * *